Patented Feb. 20, 1934

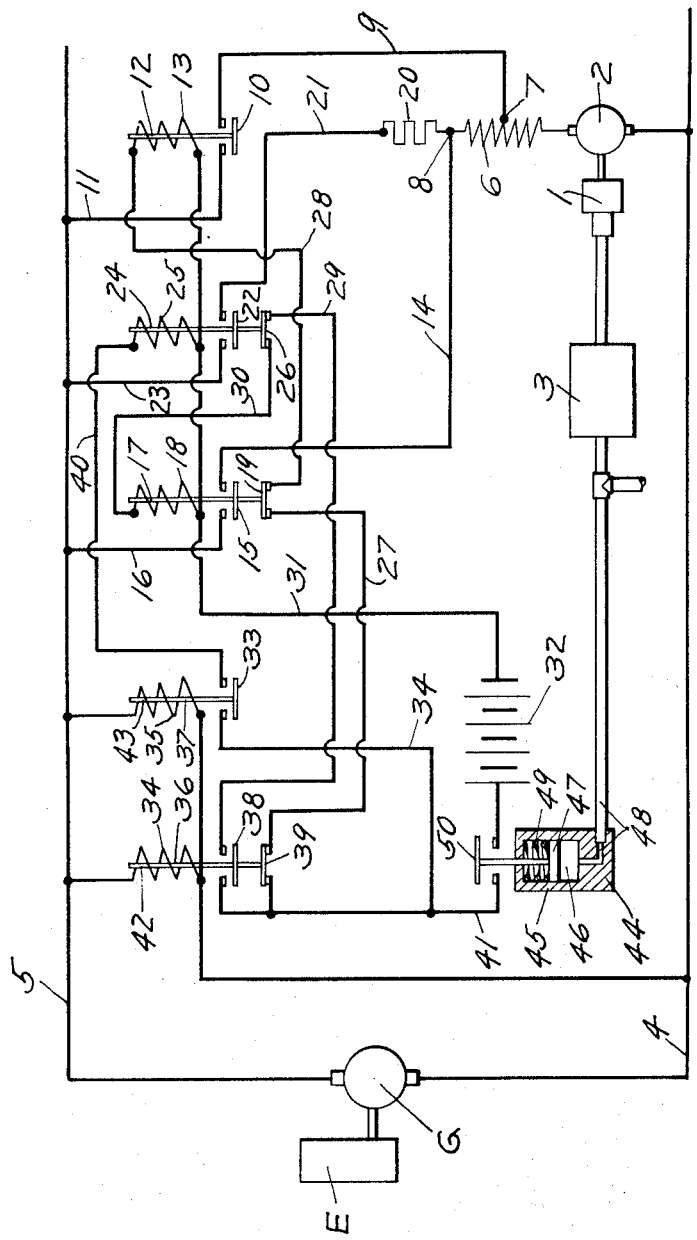

1,947,712

UNITED STATES PATENT OFFICE 1,947,712

COMPRESSOR CONTROL MEANS

John B. Grosswege, Edgewood, Pa., assignor to The Westinghouse Air Brake Company, Wilmerding, Pa., a corporation of Pennsylvania Application November 19, 1932
Serial No. 643,366

2 Claims. (Cl. 172—239)

This invention relates to motor driven air compressors and more particularly to means for controlling the motor which drives the compressor.

In the so called gas-electric and oil-electric motor cars, the electric motors for propelling the car are supplied with electric current from an electric generator driven by a gasoline or oil engine. The car is also equipped with a motor driven air compressor for supplying fluid under pressure for controlling the fluid pressure brakes on the car, and the current for the compressor motor is supplied from the generator. Inasmuch as the voltage output of the generator is varied in order to vary the speed of the car, the voltage of the current supplied to the compressor motor varies, with the result that the speed of the compressor varies.

It has heretofore been proposed to provide a motor controlling means for automatically effecting an increase in the speed of the compressor motor when the voltage of the generator is low, so as to reduce the time required to initially charge an empty fluid pressure brake system and also so as to insure an adequate supply of fluid under pressure for controlling the fluid pressure brakes in the event that the engine runs idle for a considerable time, as when coasting. A control system of the above character is disclosed in my prior Patent No. 1,774,138, issued Aug. 26, 1930.

In the aforementioned proposed controlling system, no means are provided for limiting the voltage supplied to the compressor motor when the generator voltage exceeds a certain value. It should be understood, that the voltage output of the generator varies substantially in direct proportion to the speed at which the generator is driven and that the speed of the compressor motor varies substantially in direct proportion to the voltage of the current impressed upon it. Therefore, when the generator is driven at high speed in order to supply high voltage current to the car motors for propelling the car at a high speed, the compressor will run at an excessive speed, with consequent burning of brushes and commutator, over-heating, loss of efficiency, excessive vibration and rapid wear.

It is the principal object of this invention to obviate the above mentioned difficulty by providing, in a motor control system of the aforementioned type, means for automatically causing the compressor motor to run at a speed slower than the normal, or speed at which the compressor motor would otherwise run, when the generator voltage exceeds a predetermined value.

Other objects and advantages will appear from the following more detailed description of the invention.

In the accompanying drawing, the single figure is a diagrammatic view of the motor control system, embodying my invention.

As shown in the drawing, the equipment may comprise an electric generator G, adapted to be driven by a gas or an oil engine E on a car, and a compressor 1 driven by a motor having an armature 2 for supplying fluid to the storage reservoir 3.

A main lead 4 from the generator G is connected to the armature 2 of the compressor motor. One end of the field coil 6 of the motor is connected to the armature 2 and taps are taken from the field coil 6 at 7 and 8. The tap 7 is connected by a wire 9 to a switch contact controlled by a switch member 10, said switch contact being adapted to be connected through the switch member 10 to a switch contact connected by a wire 11 to lead 5 of the generator. The switch member 10 is carried by a solenoid core 12, which is controlled by a coil 13.

The tap 8 is connected by a wire 14 to a switch contact controlled by a switch member 15, said switch contact being adapted to be connected through the switch member 15 to a switch contact connected by a wire 16 to the generator lead 5. The switch member 15 is mounted on a solenoid core 17 which is controlled by a coil 18, said core having also mounted thereon a switch member 19, the purpose of which will be described hereinafter.

The tap 8 is also connected to one terminal of a resistance unit 20, the other terminal of said unit being connected by means of a wire 21 to a switch contact controlled by a switch member 22, said contact being adapted to be connected through the switch member 22 to a switch contact connected by a wire 23 to the lead 5. The switch member is carried by a solenoid core 24 which is controlled by a coil 25. Said core also carries a switch contact 26, the purpose of which will be described hereinafter.

The switch member 19 is adapted to open the circuit from a control wire 27 to a control wire 28 when the switch member 15 closes the circuit from the wire 16 to the wire 14, and when the switch member 15 opens the circuit from the wire 16 to the wire 14, the switch member 19 closes the circuit from the control wire 27 to the control wire 28.

The switch member 26 is adapted to open the circuit from a control wire 29 to a control wire 30 when the switch member 22 closes the circuit from the wire 23 to the wire 21, and when the switch member 22 opens the circuit from the wire 23 to the wire 21, the switch member 26 closes the circuit from the control wire 29 to the control wire 30.

The control circuit wires 28 and 30 are connected, respectively, to one terminal of the coils 13 and 18. The other terminals of said coils and one terminal of the coil 25 are connected to a common wire 31, which is connected to a battery or other source of current supply 32. The other terminal of the coil 25 is connected by a wire 40 to a switch contact controlled by a switch member 33 of a voltage relay device 43, for a purpose which will now be explained.

For selectively controlling the circuits through the solenoid coils 13, 18 and 25, the voltage relay devices 42 and 43 are provided. The voltage relay device 42 comprises an operating coil 34, connected across the generator leads 4 and 5, and a plunger 36 having mounted thereon the switch members 38 and 39, the coil being adapted to control the operation of the plunger. The switch member 38 is adapted to connect one contact, which is connected to the control wire 29, to another contact which is connected to a wire 41 leading to a switch contact controlled by the switch member 50 of the usual pump governor device 44, which will be described hereinafter. The switch member 39 is adapted to connect one contact, which is connected to the control wire 27, to another contact which is connected to the wire 41. The switch members 38 and 39 and the contacts which they control, respectively, are so arranged, that the switch member 38 opens the circuit from the wire 41 to the wire 29 when the switch member 39 closes the circuit from the wire 41 to the wire 27, and when the switch member 38 closes the circuit from the wire 41 to the wire 29, the switch member 39 opens the circuit from the wire 41 to the wire 27.

The voltage relay device 43 comprises an operating coil 35 connected across the generator leads 4 and 5 and a plunger 37 carrying a switch member 33, the coil being adapted to control the operation of the plunger. The switch member 33 is adapted to connect one contact which is connected to the control wire 40, as hereinbefore mentioned, to another contact which is connected by a wire 34 to the wire 41.

It will thus be seen, that the operating coils 34 and 35 of the voltage relay devices 42 and 43, respectively, are both connected across the generator leads, but it should be understood that the voltage relay device 43 is responsive only to a voltage which is a predetermined degree higher than that voltage at which the relay device 42 responds.

The circuit through the wire 41 is controlled by a pump governor switch device 44, which may comprise a cylinder 45, having a piston chamber 46 containing a piston 47 subject on one side to the pressure of the fluid in the storage reservoir 3 through the pipe and passage 48 and subject on the other side to the pressure of a coiled spring 49. The piston 47 is adapted to operate a switch member 50. When the pressure of the fluid supplied to the storage reservoir 3, and therefore to the piston chamber 46, by the operation of the compressor, falls below a predetermined pressure, as determined by the value of spring 49, the piston 47 is operated to cause the switch member 50 to close the circuit through the wire 41.

In operation, when the engine driving the generator is running at a low speed, such as when idling, the voltage developed by the generator G and impressed on the operating coils 34 and 35 of the voltage relay devices 42 and 43, respectively, is insufficient to operate the respective plungers 36 and 37. Therefore, the switch members 38, 39 and 33 remain in the respective positions shown in the drawing, in which the switch member 39 closes the circuit from the wire 41 to the wire 27, the switch member 38 opens the circuit from wire 41 to wire 29 and the switch member 33 opens the circuit from wire 34 to wire 40.

Assuming that the pressure of the fluid in the storage reservoir 3 and in chamber 46 of the governor device 44 is sufficient to maintain the piston 47 in the position shown, against the opposing pressure of the spring 49, the switch member 50 maintains open the circuit through the wire 41 and the switch members 15, 19, 22, 26 and 10 remain in the respective positions shown in the drawing, as will be understood from the description hereinafter.

When the pressure of the fluid in the storage reservoir 3 and in the piston chamber 46 falls to a degree less than the opposing pressure of the spring 49, the piston 47 will be moved downwardly, causing the switch member 50 to close the circuit through the wire 41. With the switch member 19 in the position shown, the control circuit containing the coil 13 is thus closed from the battery 32 through the wire 41, switch member 39, wire 27, switch member 19, wire 28, coil 13 and wire 31. The consequent flow of current through the coil 13 causes the solenoid core 12 to operate so as to close the switch member 10, thereby completing a circuit from the generator lead 5 through wires 11 and 9 to the field coil 6 at the intermediate tap 7, thence through the compressor motor armature 2 to the generator lead 4. It will thus be seen that when the generator is running at low speed, only a portion of the field coil 6 is cut into the generator circuit, so that as a result, the compressor motor is operated at a higher speed than if the whole field coil were cut in.

When the pressure of the fluid in the storage reservoir 3 and in chamber 46 of the pump governor device 44, has been increased to a predetermined maximum value, as determined by the value of the spring 49, the piston 47 will be moved upwardly to the position shown in the drawing, in which the circuit through wire 41 is opened, which then causes the deenergization of the coil 13. The solenoid core 12 then moves the switch member 10 to the open position, as shown in the drawing, in which position the generator circuit through wires 11 and 9 to the field coil 6 is opened, thus cutting off the supply of current to the compressor motor and stopping the air compressor.

When the speed of the engine is increased to a sufficient degree and the generator voltage is correspondingly increased, said increased voltage, being impressed on the operating coil 34, causes the relay to operate and shift the plunger 36 upwardly to a position in which the switch member 38 connects wires 41 and 29, while the switch member 39 breaks the connection between wires 41 and 27.

Then, when the pump governor device 44 operates to close the switch member 50, as hereinbefore described, the control circuit containing the coil 18 is closed from the battery 32 through the wire 41, switch members 50 and 38, wire 29, switch member 26, wire 30, coil 18 and wire 31. Flow of current through the coil 18 then causes the solenoid core 17 to operate and shift the switch member 15 so as to close the main circuit from the wire 16 to the wire 14 and thence to the tap 8 on the field coil 6. The generator current from the lead 5, entering the field coil 6 at the tap 8, flows through the entire field coil, thus causing the air compressor motor to operate at a lower speed than if the current flowed through only a portion of the field coil.

It will be noted that when the solenoid core 17 is operated to shift the switch member 15 so as to connect the wires 16 and 14, as above mentioned, the switch member 19 is shifted so as to disconnect wire 27 from wire 28, but this is of no significance at this time, because the circuit from the wire 41 to the wire 27 is broken by the switch member 39, as hereinbefore mentioned. If the circuit to the coil 12 were not opened at either of the switch members 39 or 19, as mentioned, then current flowing into the field coil at the tap 7 at the same time that current is flowing into the field coil at the tap 8 would cause severe burning of the commutator and brushes.

When the speed of the engine is still further increased, the voltage of the current generated by the generator G will increase until this voltage, being impressed on the operating coil 35 of the voltage relay device 43, causes the plunger 37 to be shifted upwardly to a position in which the switch member 33 connects wires 34 and 40.

Now, when the governor device 44 operates to close the switch 50, in the manner hereinbefore described, the control circuit containing the coil 25 is closed from the battery 32 through wires 41 and 34, switch member 33, wire 40, coil 25 and wire 31. Current flowing through the coil 25 energizes the coil so that the solenoid core 24 operates and shifts the switch member 22 upwardly to a position in which the main circuit is closed from the wire 23 to the wire 21 and thence to the resistance unit 20. The generator current from the lead 5 then flows through the series connected resistance unit 20 and the whole field coil 6, with the result that the compressor motor operates at a lower speed than if the current flowed through only the field coil.

It should be noted that the current which energizes the operating coil 35 of the voltage relay device 43 also maintains the operating coil 34 of the voltage device 42 energized, with the result that the switch member 38 remains in the position in which the circuit is closed from wire 41 to wire 29. However, the above mentioned operation of the solenoid core 24 causes the switch member 26 to open the circuit from the wire 29 to the wire 30. The resulting deenergization of the coil 18 causes the solenoid core 17 to operate and shift the switch member 15 downwardly to the position shown in the drawing, in which the switch member 15 opens the circuit to the field coil at the tap 8. Thus, the current supply through the field coil only is cut off, which permits the voltage of the current supplied through the resistance unit 20 to the field coil to control the speed of the compressor, and, as a result, the compressor will run at a slower speed than if the field coil only were cut in.

The above mentioned operation of the solenoid core 17 causes the switch member 19 to be shifted so as to close the circuit from wire 27 to wire 28, but this is of no importance at this time, because the circuit from wire 41 to wire 27 is open at the switch member 39, as hereinbefore mentioned.

It will be apparent from the foregoing description that my invention provides a motor control system by means of which the compressor motor is prevented from running at an excessive speed when the generator is running at a high speed and the voltage is high.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with an electric motor, an electric generator for supplying current to said motor, and a resistance unit connected in series with the field coil of the motor, of means operative at a predetermined low voltage for automatically causing the generator current to flow through only a portion of the field coil of the motor, to thereby cause the motor to run at a higher speed than normal, means operative upon a predetermined increase in voltage of the generator for automatically causing the generator current to flow through the whole field coil of the motor, to thereby cause the motor to run at a slower speed than normal, and means operating upon a still greater predetermined increase in voltage of the generator for automatically causing the generator current to flow through the series connected resistance unit and field coil of the motor, to thereby cause the motor to run at a slower speed than normal.

2. The combination with an electric motor, an electric generator for supplying current to said motor, and a resistance unit connected in series with the field coil of the motor, of an electrically controlled switch device operative to connect only a portion of the field coil of the motor into the generator circuit, an electrically controlled switch device operative to connect the whole field coil into the generator circuit, an electrically controlled switch device operative to connect the series connected resistance unit and field coil into the generator circuit, an electrically controlled relay switch automatically operative upon a predetermined increase or a predetermined decrease in the generator voltage for cutting in one or the other of the first two mentioned electrically controlled switch devices, and an electrically controlled relay switch operative upon a still greater predetermined increase in generator voltage for cutting in the last mentioned electrically controlled switch device and operative upon a predetermined decrease in generator voltage for cutting out the last mentioned electrically controlled switch device.

JOHN B. GROSSWEGE.